United States Patent [19]

Saito et al.

[11] 4,404,322

[45] Sep. 13, 1983

[54] HEAT RESISTANT RESIN COMPOSITION

[75] Inventors: Kiyotaka Saito; Tomoyuki Kitsunai, both of Machida; Shozo Hori, Ayase, all of Japan

[73] Assignee: Denki Kagaku Kogyo Kabushiki Kaisha, Tokyo, Japan

[21] Appl. No.: 340,909

[22] Filed: Jan. 20, 1982

[30] Foreign Application Priority Data

Jan. 28, 1981 [JP] Japan .................................. 56-11157
Jan. 28, 1981 [JP] Japan .................................. 56-11158

[51] Int. Cl.$^3$ ...................... C08L 37/00; C08L 51/04
[52] U.S. Cl. ........................................... 525/74; 525/73
[58] Field of Search .................................... 525/74, 73

[56] References Cited

U.S. PATENT DOCUMENTS

| | | | |
|---|---|---|---|
| 3,652,726 | 3/1972 | Nield et al. | 525/67 |
| 3,801,549 | 4/1974 | Moore et al. | 264/331.18 |
| 3,830,873 | 8/1974 | Yoshida et al. | 525/74 |
| 4,197,376 | 4/1980 | Lee et al. | 525/74 |
| 4,223,096 | 9/1980 | Lee et al. | 525/74 |
| 4,305,869 | 12/1981 | Lee et al. | 525/74 |

*Primary Examiner*—J. Ziegler
*Attorney, Agent, or Firm*—Jordan and Hamburg

[57] ABSTRACT

A heat resistant thermoplastic resin composition is provided which comprises an iminated copolymer prepared by iminating a copolymer obtained by copolymerizing an aromatic vinyl monomer, maleic acid anhydride and a vinyl monomer copolymerizable with the aromatic vinyl monomer and maleic acid anhydride with the use of ammonia and/or a primary amine, and mixed with a graft polymer with or without a styrene base polymer.

10 Claims, No Drawings

HEAT RESISTANT RESIN COMPOSITION

BACKGROUND OF THE INVENTION

1. Field of the Invention

This invention relates to a novel thermoplastic resin composition which is remarkably improved in thermal stability, impact strength, hue and moldability or machinability, and more particularly to a novel heat resistant resin composition comprising an iminated copolymer prepared by iminating a copolymer obtained by copolymerizing an aromatic vinyl monomer, maleic acid anhydride and a vinyl monomer copolymerizable with the aromatic vinyl monomer and maleic acid anhydride with the use of ammonia and/or a primary amine, and mixed with a graft polymer with or without a styrene base polymer.

2. Prior Art

A process for the preparation of a copolymer comprising an aromatic vinyl monomer, maleic acid anhydride and another vinyl monomer has hitherto been known (for example, by U.S. Pat. Nos. 2,439,227, 2,914,505, 3,919,354 and 4,223,096).

A composition made of said copolymer and mixed with a graft polymer to be improved in impact strength has been also known (for example, by U.S. Pat. No. 4,197,376).

These known copolymers prepared by copolymerizing maleic acid anhydride have high thermal deformation temperatures. However, these known copolymer compositions have disadvantages that they are apt to be decomposed due to chemical reactions not only by the presence of water at high temperature but also by the action of heat since acid anhydride residues originated from maleic acid anhydride are present in the chains of the copolymers to suffer considerable limitation at the subsequent injection or extrusion molding step, and that the mechanical properties, particularly impact strength, is deteriorated accompanied with change in hue when the molded articles are allowed to contact with water or steam or exposed to high temperature.

A composition composed of an iminated copolymer prepared by iminating with alkyl amine a copolymer of an aromatic vinyl monomer and maleic acid anhydride, and a graft polymer has been known. (Reference should be made to U.S. Pat. Nos. 3,642,949 and 3,801,549). However, this known composition has a disadvantage that the impact strength thereof is not satisfactory. Also, there has been known in the art a composition composed of a graft polymer and a copolymer prepared from an aromatic vinyl monomer, acrylonitrile and an N-substituted maleimide. (Reference should be made to U.S. Pat. No. 3,652,726.) However, N-substituted maleimides are very expensive to cause economical problems, and has a disadvantage that it forms a homopolymer singly by itself leading to deterioration in impact strength and hue of the formed product.

OBJECTS AND SUMMARY OF THE INVENTION

This invention has an object of solving the aforementioned disadvantages of the known composition, and provides a resin composition prepared by adding a thermoplastic polymer to an iminated copolymer obtained by copolymerizing an aromatic vinyl monomer, maleic acid anhydride and another vinyl monomer copolymerizable with said aromatic vinyl monomer and maleic acid anhydride, thereby to improve the fluidity of the resultant composition and to remarkably improve the moldability and machinability of the resultant product. More specifically, this invention is directed to a thermoplastic resin composition comprising:

(a) 20 to 90 parts by weight of an iminated polymer having imino groups prepared from a copolymer having a weight average molecular weight of not less than 10,000 and obtained by copolymerizing 40 to 90% by weight of an aromatic vinyl monomer, 5 to 40% by weight of maleic acid anhydride and 5 to 40% by weight of a vinyl monomer copolymerizable with the aforementioned aromatic vinyl monomer and maleic acid anhydride, said iminated polymer being obtained by reacting said copolymer with one selected from the group consisting of ammonia, a primary amine and mixtures thereof;

(b) 10 to 60 parts by weight of a graft copolymer prepared by grafting 30 to 80 parts by weight of a monomer mixture consisting of 40 to 80% by weight of an aromatic vinyl monomer, 20 to 40% by weight of a cyanated vinyl monomer and 0 to 30% by weight of a vinyl monomer copolymerizable with the aforementioned aromatic vinyl monomer and the aforementioned cyanated vinyl monomer upon 20 to 70 parts by weight of a rubber-like polymer; and (c) 0 to 80 parts by weight of a styrene base copolymer prepared from 40 to 100% by weight of an aromatic vinyl monomer, 0 to 40% by weight of a cyanated vinyl monomer and 0 to 40% by weight of a vinyl monomer copolymerizable with the aforementioned aromatic vinyl monomer and the aforementioned cyanated vinyl monomer.

DESCRIPTION OF THE INVENTION

The present invention will now be described more in detail. Initially, the process for the preparation of the iminated polymer (a) (component a) will be described.

The iminated polymer (a) contained in the composition of this invention includes a base polymer having a weight average molecular weight of not less than 10,000 is prepared from a mixture comprising 40 to 90 wt% of an aromatic vinyl monomer, 5 to 40 wt% of maleic acid anhydride and 5 to 40 wt% of another vinyl monomer copolymerizable with the aromatic vinyl monomer and maleic acid anhydride. If the content of the aromatic vinyl monomer is less than 40 wt%, the characteristics of the aromatic vinyl compounds, particularly the easiness in molding and stability in dimensions especially when the aromatic vinyl compound is styrene, are lost. If the content of maleic acid anhydride is less than 5 wt%, improvement in heat resistant property is not attained, whereas if the content thereof exceeds 40 wt%, the resultant copolymer becomes fragile to be extremely deteriorated in moldability. If the content of the copolymerizable vinyl monomer is not within the range as defined above, the impact strength is not improved. The preferable mixing ratio of the components in the composition according to this invention ranges within the ratio of 50 to 85 wt% of an aromatic vinyl monomer, 10 to 35 wt% of maleic acid anhydride and 5 to 25 wt% of a vinyl monomer copolymerizable with the aforementioned aromatic vinyl monomer and maleic acid anhydride, more preferably 55 to 75 wt% of an aromatic vinyl monomer, 15 to 35 wt% of maleic acid anhydride and 7 to 20 wt% of a vinyl monomer copolymerizable with the aforementioned aromatic monomer and maleic acid anhydride. Preferable aromatic vinyl monomers used for the preparation of the iminated polymer (a) include styrene monomers, such as styrene, α-methylstyrene, vinyltoluene, t-butylstyrene, chlorostyrene and substituted monomers thereof and mixtures thereof, the most preferred being monomers of styrene and α-methylstyrene and mixtures thereof. The vinyl monomers copolymerizable with the aforementioned aromatic vinyl monomer or monomers and maleic acid anhydride include cyanated vinyl monomers, such as acrylonitrile, methacrylonitrile, α-chloroacrylonitrile; acrylic ester monomers, such as methylacrylic esters, ethylacrylic esters and butylacrylic esters; methacrylic ester monomers, such as methylmethacrylic esters and ethylmethacrylic esters; and vinyl carboxylic acid monomers, such as acrylic acid and methacrylic acid; and the preferable being monomers of acrylonitrile, acrylic esters, methacrylic esters and methacrylic acid and mixtures thereof.

The ammonia and/or primary amine used in the imination reaction in the present invention may be in the form of anhydride or an aqueous solution, and the examples of primary amines usable for this purpose include alkylamines such as methylamine, ethylamine, n-propylamine, iso-propylamine, butylamine, pentylamine and cyclohexylamine, aromatic amines such as aniline, tolylamine and naphthylamine, and aromatic amines substituted by halogen such as aniline substituted by chlorine or bromine and mixtures thereof; and particularly preferred are aniline and derivatives of aniline and mixtures thereof. The amount of the ammonia and/or primary amine used in this reaction substantially corresponds to the molar equivalent of the maleic acid contained in the aromatic vinyl-maleic acid copolymer. The preferred used equivalent thereof is 0.9 to 1.1 times as much as the molar equivalent of maleic acid.

In the present invention, a tertiary amine may be used as the catalyst when the aromatic vinyl-maleic acid anhydride copolymer is iminated with ammonia and/or primary amine. If a tertiary amine is not present in the imination step, the time required for the imination reaction is prolonged for a considerable period. If a tertiary amine is used, the preferable added amount thereof ranges within 0.001 to 0.5 moles as much as the existing maleic acid present in the copolymer. The iminated polymers having the degree of imination of less than 90 mol% are not preferred, since they are poor in stabilities in water and against heat.

If the imination reaction is carried out under conditions dissolved in a solvent or suspended in a non-aqueous medium, it is preferred that the reaction be carried out in an ordinary reaction vessel, such as an autoclave; whereas if the reaction is carried out in a bulk-molten state, an extruder provided with a vent device may be used.

The imination reaction may be carried out at a temperature of about 80° C. to about 350° C., and the preferable temperature range being from 100° C. to 300° C. A temperature of lower than 80° C. is not practical since the reaction velocity is too low to require a long time for the completion of reaction. On the contrary, if the reaction temperature exceeds 350° C., the polymer is thermally decomposed to result in deterioration of the properties of the resultant product.

Examples of tertiary amines include trimethylamine, triethylamine, tripropylamine, tributylamine, N,N-dimethylaniline and N,N-diethylaniline. Solvents which may be used as the solvents at the step of iminating the copolymers of maleic acid anhydride when they are iminated in solutions, include acetone, methyl ethyl ketone, methyl isobutyl ketone, acetophenone, tetrahydrofuran, dimethyl formamide and toluene, and the particularly preferred are methyl ethyl ketone and toluene. Non-aqueous media which may be used at the step of iminating the copolymers in suspended state include aliphatic hydrocarbons such as heptane, hexane, pentane, octane, 2-methylpentane, cyclopentane and cyclohexane.

Aromatic vinyl monomers used for the preparation of the graft copolymer defined in component (b), include styrene base monomers such as styrene, α-methylstyrene, vinyltoluene, t-butylstyrene and chlorostyrene, and substituted monomers thereof and mixture thereof; and amongst them styrene and α-methylstyrene monomers and mixtures thereof are particularly preferred.

As to the cyanated vinyl monomers, there may be mentioned acrylonitrile and α-chloroacrylonitrile, and acrylonitrile being particularly preferred. Examples of the vinyl monomer copolymerizable with the aforementioned compounds include monomers of acrylic esters such as methylacrylic esters, ethylacrylic esters and butylacrylic esters, monomers of methacrylic esters such as methylmethacrylic esters and ethylmethacrylic esters, monomers of vinyl carboxylic acids such as acrylic acid and methacrylic acid, acrylic amides, methacrylic amides, acenaphthylene and N-vinyl carbazol. Amongst them, the monomers of acrylic esters, methacrylic esters, acrylic acid and methacrylic acid and mixtures thereof are particularly preferred.

The graft copolymer used as the component (b) in this invention is prepared by polymerizing 30 to 80 parts by weight of a monomer mixture consisting of 40 to 80 wt% of an aromatic vinyl monomer, 20 to 40 wt% of a cyanated vinyl monomer and, if necessary, 0 to 30 wt% of a vinyl monomer copolymerizable with the aforementioned aromatic and cyanated vinyl monomers in the presence of 20 to 70 parts by weight of a rubber-like polymer.

The rubber-like polymers include a polymer prepared by polymerizing butadiene singly or in combination with another vinyl monomer copolymerizable with butadiene, and a polymer prepared by polymerizing an acrylic ester singly or in combination with another vinyl monomer copolymerizable with the used acrylic ester.

The graft copolymer may be prepared by any of the known processes including, for example, an aqueous heterogeneous polymerization process such as suspension polymerization or emulsion polymerization, a block polymerization process, a solution polymerization process and a precipitation heterogeneous polymerization process in which a product polymer is grafted in a non-solvent. Two or more of the aforementioned processes may be combined to prepare the graft copolymer.

The iminated polymer (a) and the graft copolymer (b) may be blended by a variety of blending methods, for instance, the components (a) and (b) may be blended together in a mixing machine, rotary mixer or a mixing extruder, or a solution or latex of the component (b) may be admixed with the component (a) which is pulverized if necessary. If the components (a) and (b) are blended by the use of a solvent, the solvent is removed and the prepared solid mixture is dried to obtain a dry mixture.

The thermoplastic styrene base copolymers used as the component (c) in the composition according to this invention include one or more of styrene base copolymers, the representative examples thereof being polystyrene, polystyrene modified with a rubber, acrylonitrilestyrene copolymer, acrylonitrile-α-methylstyrene copolymer, acrylonitrile-butadiene-styrene copolymer, acrylonitrile-butadiene-styrene-α-methylstyrene copolymer, acrylonitrile-acryl base rubber-styrene copolymer, acrylonitrile-ethylene/propylene rubber-styrene copolymer, styrene-methylmethacrylate copolymer and methylmethacrylate-butadiene-styrene copolymer.

As has been described hereinbefore, the composition of the present invention is preferably composed of 20 to 90 parts, by weight, of the aforementioned iminated polymer, 10 to 60 parts, by weight, of the aforementioned graft copolymer and up to 80 parts, by weight, of the aforementioned styrene base copolymer. More preferable mixing ratio is 40 to 75 parts, by weight, of the iminated polymer, 20 to 45 parts, by weight, of the graft copolymer and up to 20 parts, by weight, of the styrene base copolymer.

The mixing ratio of the components (a), (b) and (c) is limited within the range as defined in the appended claim for the following reasons. Although an iminated polymer is excellent in heat resistant property, the impact strength and the moldability thereof are poor if it is used singly. By blending the graft copolymer and the styrene base copolymer into the iminated polymer within a mixing ratio as defined by this invention, the resultant blend composition is improved in impact strength and moldability without deteriorating the heat resistant property appreciably.

The aforementioned composition according to this invention may be obtained by any of the known methods including, for example, a method of mixing in a molten state, a multi-stage melting and kneading method in which master pellets may be used, a method of blending solutions of the components, and a method of effecting graft polymerization in the presence of a thermoplastic resin.

The composition according to this invention may be further added with a stabilizer, lubricant, filler and/or coloring agent.

The present invention will now be described more in detail by referring to examples thereof. However, it should be noted here that the present invention is not to be limited only to the following examples. In the examples, "part" and "%" stand for "part by weight" and "wt%" unless otherwise specified.

EXAMPLE 1

(1) PREPARATION OF COPOLYMER OF MALEIC ACID ANHYDRIDE (a) 67 parts of styrene and 8 parts of acrylonitrile were charged in an autoclave provided with a stirrer, and the system was purged with nitrogen gas and then heated to 80° C. A solution prepared by dissolving 25 parts of maleic acid anhydride and 0.3 parts of benzoyl peroxide in 50 parts of methyl ethyl ketone was added into the autoclave over a period of 10 hours. The temperature of the content in the autoclave was maintained at 80° C. for additional 2 hours after the completion of the addition of the solution of maleic acid anhydride. A sample of the viscous reaction liquid was picked up and subjected to gas chromatography to learn the quantities of the unreacted monomers, and the polymerization percentage and the content of maleic acid anhydride in the resultant polymer were calculated from the data of the aforementioned quantitative analysis by chromatogram. 150 parts of methyl ethyl ketone were added to the reaction liquid which was then cooled to the room temperature and poured onto 800 parts of methanol while being vigorously agitated. A white powder-form polymer was obtained after filtration and drying. A variety of copolymers of maleic acid anhydride were prepared in accordance with the aforementioned process while changing the composition of the used monomers as set forth (b) to (f) in the following Table 1. The data are shown in Table 1.

TABLE 1

| Composition No. | Monomer | | | | | Polymerization Percentage (%) | Content of MAH in Polymer (%) | ηsp/c |
|---|---|---|---|---|---|---|---|---|
| | St | α-MSt | MAH | AN | MMA | | | |
| a | 67 | — | 25 | 8 | — | 94 | 26 | 0.41 |
| b | 75 | — | 15 | 10 | — | 98 | 16 | 0.47 |
| c | 52 | 15 | 25 | 8 | — | 80 | 30 | 0.37 |
| d | 60 | — | 25 | 15 | — | 90 | 27 | 0.45 |
| e | 55 | — | 30 | 15 | — | 97 | 31 | 0.41 |
| f | 60 | — | 25 | — | 15 | 81 | 30 | 0.38 |
| g | 70 | — | 30 | — | — | 87 | 33 | 0.36 |

Note:
In Table 1 above, the abridged representations stand for the following compounds: St . . . Styrene α-MSt . . . α-Methyl Styrene MAH . . . Maleic Acid Anhydride AN . . . Acrylonitirile MMA . . . Methyl Methacrylate

(2) PREPARATION OF IMINATED POLYMER 30 parts of the copolymer obtained by the step (1)-(a) and 0.3 parts of triethylamine were dissolved in 70 parts of methyl ethyl ketone contained in an autoclave, and added with 808 parts of aniline which corresponded to 1.02 times equivalent as much as the equivalent of maleic acid anhydride contained in the copolymer. After reacting at 130° C. for 7 hours, the reaction solution was cooled to the room temperature and then added with 300 parts of methanol while agitating vigorously, followed by filtration and drying to obtain an iminated polymer. The conversion rate to the imino group was determined using the C-13 NMR analyser to find that the conversion rate was 99%. The properties of the thus obtained iminated polymer are shown in Table 2.

(3) BLENDING OF THE GRAFT COPOLYMER WITH THERMOPLASTIC STYRENE BASE POLYMER 60 parts of a monomer mixture composed of 30 parts of acrylonitrile and 70 parts of styrene were subjected to emulsion polymerization in the presence of a latex containing 40 parts of a polybutadiene rubber-like polymer having a weight average particle size of 350 mμ to obtain a graft copolymer. 25 parts of the thus obtained graft copolymer, 10 parts of a styrene-acrylonitrile copolymer containing 25% of acrilonitrile and 65 parts of the iminated polymer prepared by the step (2) were blended, and the blended mixture was extruded through a 30 mmφ screw extruder provided with a vent device to form pellets. The properties of the blended composition are shown in Table 3.

EXAMPLE 2

Iminated polymers were prepared similarly to Example 1 using, respectively, 30 parts of the polymers (b) to (f) of maleic acid anhydride as set forth in Example 1.

The properties of these iminated polymers are shown in Table 2. 65 parts of each of these iminated polymers were blended with the graft copolymer and the thermoplastic styrene base copolymer as used in Example 1 similarly to Example 1. The properties of the blended compositions are shown by Run Nos. 9 to 14 in Table 3.

EXAMPLE 3

A similar procedure was repeated except in that a thermoplastic polymer prepared by polymerizing 28 parts of acrylonitrile, 8 parts of styrene and 64 parts of α-methylstyrene was used in place of the polymer (d) used in Example 2. The results are shown by Run No. 15 in Table 3.

EXAMPLE 4

A similar procedure as described in Example 1 was repeated except in that a graft polymer prepared by polymerizing 30 parts of a monomer mixture composed of 30 parts of acrylonitrile and 70 parts of styrene in the presence of 50 parts of polybutadiene rubber-like polymer was used in place of the polymer (d) as used in Example 2. The results are shown by Run No. 16 in Table 3.

COMPARATIVE EXAMPLE 1

A similar procedure was repeated as in Example 1, except in that the polymer (d) of maleic acid anhydride obtained in Example 1 was not iminated. The results are shown by Run No. 7 in Table 2 and Run No. 17 in Table 3.

COMPARATIVE EXAMPLE 2

A similar procedure was repeated as in Example 1, except in that the monomer composition as used in Example 1 was changed to a mixture containing 70 parts of styrene and 30 parts of maleic acid anhydride. The results are shown by Composition No. g in Table 1, Run No. 8 in Table 2 and Run No. 18 in Table 3.

TABLE 2

| Run No. | Maleic Acid Anhydride Base Polymer | Imination Percentage (%) | Heat Stability (°C.) | Vicat Softening Point (°C.) | Impact Strength (kg · cm/cm) | MFI (g/10 min.) |
| --- | --- | --- | --- | --- | --- | --- |
| 1 | a | 99 | 350 | 166 | 2.3 | 0.1 |
| 2 | b | 98 | 360 | 141 | 2.6 | 0.2 |
| 3 | c | 99 | 349 | 169 | 2.1 | 0.1 |
| 4 | d | 99 | 355 | 165 | 2.7 | 0.1 |
| 5 | e | 99 | 356 | 167 | 3.4 | 0.1 |
| 6 | f | 99 | 350 | 168 | 2.1 | 0.1 |
| 7 | d | 0 | 265 | 152 | 1.6 | 0.1 |
| 8 | g | 98 | 351 | 165 | 1.3 | 0.1 |

TABLE 3

| Run No. | Iminated Polymer | Iminated Polymer (wt %) | Grafted Polymer (wt %) | Thermoplastic Resin (wt %) | Vicat Softening Point (°C.) | Impact Strength (kg · cm/cm) | MFI |
| --- | --- | --- | --- | --- | --- | --- | --- |
| 9 | 1 | 65 | 25 | 10 | 131 | 8.8 | 2.0 |
| 10 | 2 | " | " | " | 118 | 14.0 | 2.4 |
| 11 | 3 | " | " | " | 135 | 9.8 | 1.7 |
| 12 | 4 | " | " | " | 138 | 11.0 | 1.8 |
| 13 | 5 | " | " | " | 141 | 12.5 | 1.6 |
| 14 | 6 | " | " | " | 138 | 10.0 | 2.0 |
| 15 | 4 | " | " | " | 140 | 12.9 | 1.7 |
| 16 | 4 | " | " | " | 142 | 13.5 | 1.4 |
| 17 | 7 | " | " | " | 111 | 6.0 | 0.6 |
| 18 | 8 | " | " | " | 140 | 5.4 | 1.0 |

The properties as set forth in Tables 2 and 3 were measured in accordance with the following methods:

(1) Heat Stability:
A sample was subjected to thermobalance analysis while nitrogen gas was flown at a rate of 50 cc/min. and the temperature was raised at a rate of 10° C./min. to learn the temperature at which the weight reduction of the polymer reached 1% of the initial weight.

(2) Vicat Softening Point:
Measured generally in accordance with the ASTM-D-1525 Method, under a loading of 5 kg.

(3) Impact Strength:
Measured generally in accordance with the ASTM-D-256 Method, using the Izot impact testing machine, with a notched sample.

(4) MFI (Melt Flow Index):
Generally in accordance with the ASTM-D-1238 Method, measured at 250° C. under a loading of 5 kg.

(5) Imination Percentage:
Calculated from the area enclosed by the $C_{13}$-NMR spectrum of the carbon atom of the carbonyl group, using a NMR analyser available from Japan Electron Optics Laboratory Co., Ltd. under the trade name "FX-90 QFT".

Although the present invention has been described with reference to the specific examples thereof, it should be understood that various modifications and variations can be easily made by those skilled in the art without departing from the broad aspect and spirit of the invention. It is thus intended to embrace all such modification and variations within the scope of the invention as defined in the appended claims.

What is claimed is:

1. A thermoplastic resin composition comprising:
(a) 20 to 90 parts by weight of an iminated polymer having imino groups prepared from a copolymer having a weight average molecular weight of not less than 10,000 and obtained by copolymerizing 40 to 90% by weight of an aromatic vinyl monomer, 5 to 40% by weight of maleic acid anhydride and 5 to 40% by weight of a vinyl monomer copolymerizable with said aromatic vinyl monomer and said maleic acid anhydride, said iminated polymer being obtained by reacting the copolymer with one selected from the group consisting of ammonia, a primary amine and mixtures thereof and said copolymerizable vinyl monomer selected from the group consisting of acrylonitrile, acrylic esters, methacrylic esters, acrylic acid, methacrylic acid and mixtures thereof;
(b) 10 to 60 parts by weight of a graft copolymer prepared by grafting 30 to 80 parts by weight of a monomer mixture consisting of 40 to 80% by weight of an aromatic vinyl monomer, 20 to 40% by weight of a cyanated vinyl monomer and 0 to 30% by weight of a vinyl monomer copolymerizable with said aromatic vinyl monomer and said cyanated vinyl monomer upon 20 to 70 parts by weight of a rubber-like polymer; and
(c) 0 to 80 parts by weight of a styrene base copolymer prepared from 40 to 100% by weight of an aromatic vinyl monomer, 0 to 40% by weight of a cyanated vinyl monomer and 0 to 40% by weight of a vinyl monomer copolymerizable with said aromatic vinyl monomer and said cyanated vinyl monomer.

2. A composition according to claim 1, wherein said aromatic vinyl monomer used for the preparation of said iminated polymer in component (a) is selected from the group consisting of styrene, α-methylstyrene, t-butylstyrene, chlorostyrene and mixtures thereof.

3. A composition according to claim 1, wherein said primary amine in component (a) is selected from the group consisting of aniline, derivatives thereof and mixtures thereof.

4. A composition according to claim 1, wherein said copolymer in component (a) is prepared from 50 to 85% by weight of the aromatic vinyl monomer, 10 to 35% by weight of maleic acid anhydride and 5 to 25% by weight of the vinyl monomer copolymerizable with said aromatic vinyl monomer and said maleic acid anhydride.

5. A composition according to claim 4, wherein said copolymer is prepared from 55 to 75% by weight of the aromatic vinyl monomer, 15 to 35% by weight of maleic acid anhydride and 7 to 20% by weight of the vinyl monomer copolymerizable with said aromatic vinyl monomer and said maleic acid anhydride.

6. A composition according to claim 1, wherein said aromatic vinyl monomer in component (b) is selected from the group consisting of styrene, α-methylstyrene and mixtures thereof and said cyanated vinyl monomer in component (b) is acrylonitrile.

7. A composition according to claim 1, wherein said rubber-like polymer in component (b) is a polymer selected from the group consisting of those prepared by polymerizing butadiene singly or in combination with one or more of vinyl monomers copolymerizable with said butadiene and those prepared by polymerizing an acrylic ester singly or in combination with one or more of vinyl monomers copolymerizable with said acrylic ester.

8. A composition according to claim 1, wherein said copolymerizable vinyl monomer in component (b) is selected from the group consisting of acrylic esters, methacrylic esters, acrylic acid, methacrylic acid and mixtures thereof.

9. A composition according to claim 1, wherein said styrene base copolymer in component (c) is selected from the group consisting of polystyrene, polystyrenes modified with rubbers, acrylonitrile-styrene copolymers, acrylonitrile-α-methylstyrene copolymers, acrylonitrile-butadiene-styrene copolymers, acrylonitrile-butadiene-styrene-α-methylstyrene copolymers, acrylonitrile-acryl-base rubber-styrene copolymers, acrylonitrile-ethylene/propylene rubber-styrene copolymers, styrene-methylmethacrylate copolymers, methylmethacrylate-butadiene-styrene copolymers and mixtures thereof.

10. A composition according to claim 1, comprising 40 to 75 parts by weight of the iminated polymer, 20 to 45 parts by weight of the grafted copolymer and 0 to 20 parts by weight of the styrene base copolymer.

* * * * *